(12) United States Patent
Cummins et al.

(10) Patent No.: US 6,770,983 B1
(45) Date of Patent: Aug. 3, 2004

(54) METHOD AND APPARATUS FOR POWERING LOWER D.C. VOLTAGE RATED DEVICES

(75) Inventors: Michael Cummins, Titusville, FL (US); Mario Magrone, Titusville, FL (US)

(73) Assignee: Fabtech, Inc., Titusville, FL (US)

( * ) Notice: Subject to any disclaimer, the term of this patent is extended or adjusted under 35 U.S.C. 154(b) by 161 days.

(21) Appl. No.: 09/961,514

(22) Filed: Sep. 22, 2001

(51) Int. Cl.[7] .................................................. B60L 1/14
(52) U.S. Cl. ........................ 307/10.8; 307/80; 307/81
(58) Field of Search ............................ 307/11, 38, 64, 307/65, 66, 10.8, 80, 81

(56) References Cited

U.S. PATENT DOCUMENTS

| | | | | |
|---|---|---|---|---|
| 5,523,631 A | * | 6/1996 | Fishman et al. | ............... 307/38 |
| 6,055,359 A | * | 4/2000 | Gillett | ........................ 388/819 |
| 6,355,990 B1 | * | 3/2002 | Mitchell | ....................... 307/64 |
| 6,455,951 B1 | * | 9/2002 | Shultz et al. | ............... 307/10.1 |

FOREIGN PATENT DOCUMENTS

JP        54131745     * 10/1979            H02J/1/00

* cited by examiner

Primary Examiner—Robert DeBeradinis
(74) Attorney, Agent, or Firm—J. Sanchelima; A. Bordas

(57) ABSTRACT

An apparatus and method for delivering power from a D.C. voltage source to one or more D.C. loads rated at lower voltages. The invention provides for the repetitive application of the higher D.C. voltage to the loads for a predetermined time period sufficient for the load to operate yet not too long to ensure that the load will not be damaged. To implement the invention, a clock signal provides the time reference for separate slots allocated for the time periods associated with each of the loads. A user selectively enables or interrupts the repetitive connection to each of one of the loads. The rate of repetition of the connection of the high voltage source could vary from 60 to 200 Hertz, preferably without degrading the operation of typical loads.

9 Claims, 2 Drawing Sheets

METHOD AND APPARATUS FOR POWERING LOWER D.C. VOLTAGE RATED DEVICES

BACKGROUND OF THE INVENTION

1. Field of the Invention

The present invention relates to a method and apparatus for powering D.C. loads from a higher rated D.C. voltage supply.

2. Description of the Related Art

Many designs for delivering a lower D.C. voltage to a load from a higher D.C. voltage have been design in the past. One of these approaches includes the use of resistive elements, such as a rheostat or equivalent resistors in series. Obviously, this is a very inefficient way of stepping down a D.C. voltage since a substantial amount of energy would be dissipated as heat.

Other approaches involve the use of rather complicated circuitry, such as DC/AC converters and DC/DC converters. These are not only complex and expensive but also inefficient.

The present invention provides a novel approach to solving this problem by using a time interval modulation technique, as it will be explained below. Let's use the example of a golf cart "electric vehicle) with a 48 volts, D.C. electrical power source and, for simplicity's sake, three accessories or loads that work with more common 12 volts D.C. inputs. Load No. 1 could be a horn; load No. 2 will be a halogen lamp and load No. 3 a fan. It has been found that these accessories do not require the application of the rated 12 volts at all times for them to function. Recognizing that 12 volts is 25% of 48 volts, it has been found that if the 48 volts supply voltage is applied with a 25% duty cycle, most of these accessories work. For example, the horn (load No. 1) works when the 48 volt supply is applied with a duty cycle of even 10%.

What is important is to realize that the different accessories, depending on their designs, will have different working ranges of duty cycles under a higher D.C. voltage than what they are rated.

Additionally, different periodic time slots of the 48-volt source can be allocated for each load or accessory. In this manner, there is an added advantage of avoiding loading down the source by operating two or more accessories simultaneously. This would eliminate the common "light-dim-with-horn blow" effect commonly experienced in these situations.

Of course, the high voltage supply, in this example the 48 volts, will be made available with a square waveform with a sufficient duty cycle to permit the allocation of contiguous time slots for each of the loads being serviced. The width of the time slots or pulses will vary with the requirements of each accessory or load.

Another benefit of this invention is that these periodic waveforms are susceptible to being measured through pick up coils in order to measure the amount of electricity used by the loads. This cannot be accomplished with purely DC driven accessories.

SUMMARY OF THE INVENTION

It is one of the main objects of the present invention to provide an apparatus and method that permits the use of a high voltage source to power lower voltage rated loads or accessories efficiently.

It is another object of this invention to provide such an apparatus and method that permits the powering of said loads independently from each other so there is no interference.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
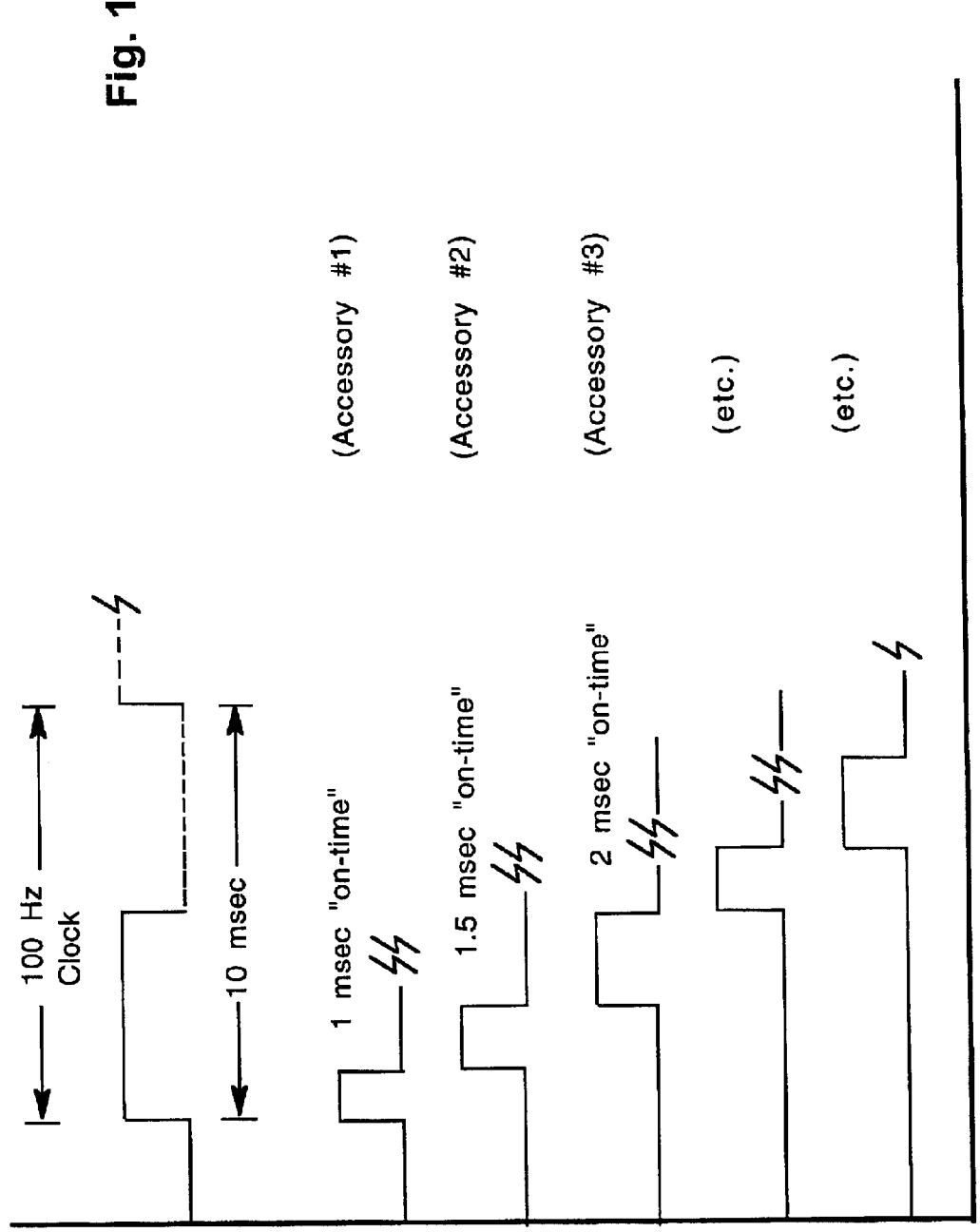
FIG. 1 represents a timing chart showing the timing relationship between the clock signal and the contiguous slots or pulse widths for the different accessories.
Figure 2:
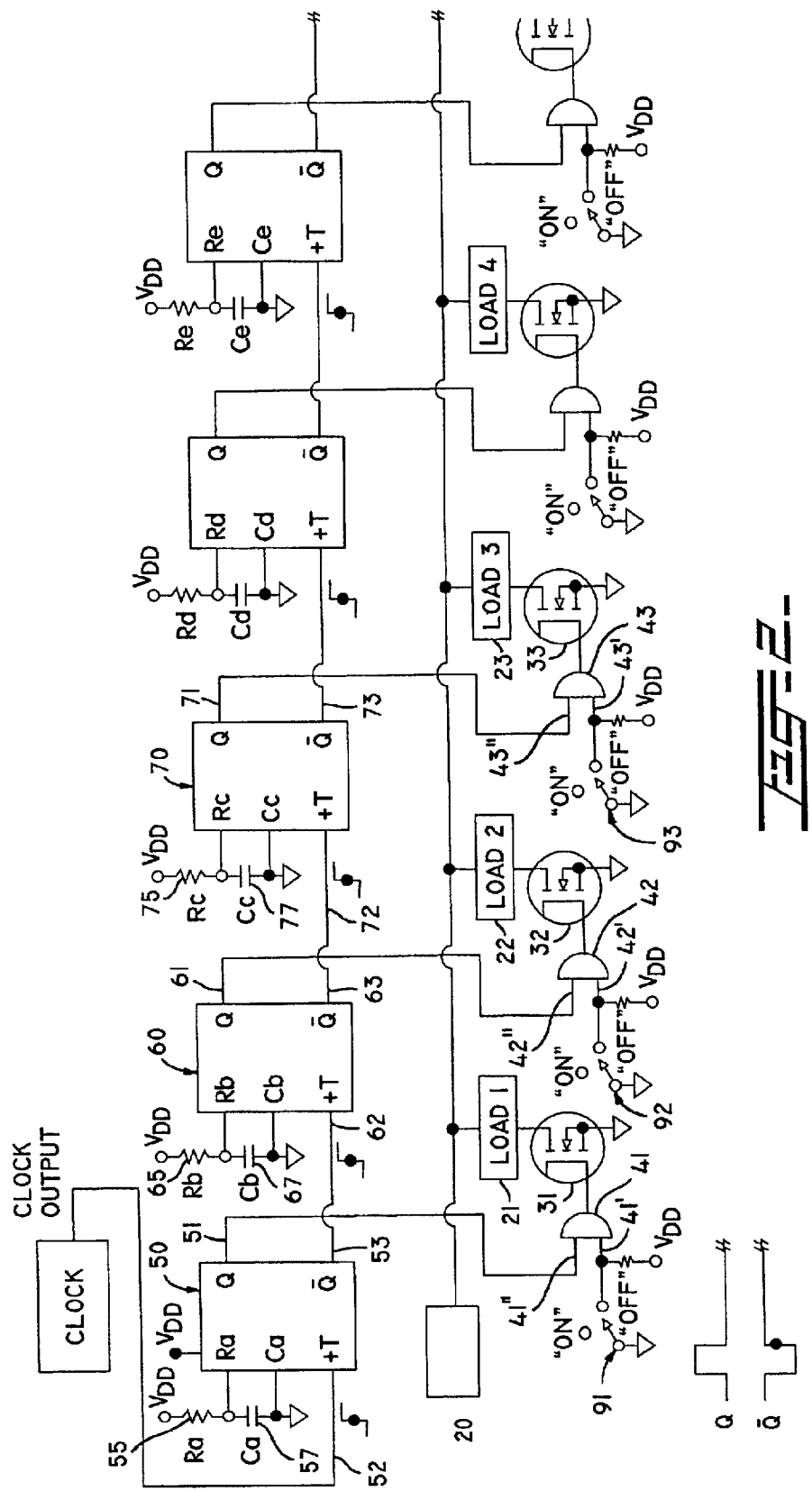
FIG. 2 shows one of the preferred embodiments for implementing the claimed invention.

Referring now to the drawings, where the present invention is generally referred to with numeral 10, it can be observed that it basically includes an electrical supply source 20, with a constant D.C. voltage connected to loads 21; 22 and 23, in this preferred embodiment, and solid state switches 31; 32 and 33 in series with, and selectively interrupting, the connection to ground (to close the circuit of the loads). Switches 31; 32 and 33 are activated by AND gates 41; 42 and 43 that include, in this preferred embodiment, two inputs namely 41' and 42". Inputs 41'; 42' and 43' are selectively interrupted or closed by switches 91; 92 and 93 which represent the actuating devices for the accessories that are activated by a user directly or through other circuits or mechanisms. These circuits or mechanisms could be utilized to automatically close these switches or ground their inputs upon the occurrence of predetermined events; i.e. the lights can automatically turn on if there is no light by providing adequate sensors, etc. Inputs 41"; 42" and 43" are connected to outputs 51; 61 and 71, respectively, of monostable multivibrators 50; 60 and 70. A clock signal of 100 Hz, in one of the preferred embodiments, is applied to toggle input 52 of multivibrator 50, negative output 53 is in turn applied to toggle input 62 of multivibrator 60. The clock signal is preferably a square wave. Similarly, output 63 is applied to toggle input 72. The resulting (accessory) signals applied to inputs 41"; 51" and 61" are shown in FIG. 1. As it can be seen, the different loads will receive voltage in separate time slots thereby avoiding competition for power when the accessories are simultaneously actuated. The width of each pulse or slot is determined by the characteristics of each load or accessory. The width for each time slot is varied, in the preferred embodiment, by changing the RC time constants of resistors 55, 65 and/or 75 and/or the capacitance of capacitors 57, 67 and 77.

The method for powering accessories with lower D.C. voltages from a higher DC voltage source includes the generation of a square clock signal, preferably, in the 60 to 200 Hertz range and assigning a periodic time slot or duty cycle, of predetermined widths to the different loads or accessories being serviced. Applying the available higher voltage source to each load and keeping the connection interrupted except for the time slots assigned to each load. Higher frequencies may be used but annoying audible sounds can be generated, or, if very high frequencies are used, they may radiate interference signals affecting other devices. Lower frequencies can create "strobe effects" from lamps.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An apparatus for powering D.C. loads comprising:

A) an electrical source of D.C. voltage;

B) at least one load for said source D.C. voltage and rated at lower voltages than said source of D.C. voltage;

C) at least one corresponding first switch means connected in series with said load and source of D.C. voltage, including an input for selectively opening and closing said first switch means;

D) means for actuating said inputs for predetermined repetitive time periods that are sufficiently long for said loads to operate; and E) second switch means for selectively interrupting said means for actuating said input.

2. The apparatus set forth in claim 1 wherein there are at least two of said loads and at least two corresponding first switch means and wherein said predetermined repetitive time periods are allocated unique time slots for each of said loads.

3. The apparatus set forth in claim 2 further including means for varying said repetitive time periods individually.

4. The apparatus set forth in claim 3 wherein said first and second switch mean include solid state devices.

5. The apparatus set forth in claim 3 wherein the rate of repetition of said repetitive time periods between 60 Hertz and 200 Hertz.

6. A method for powering D.C. loads, comprising the steps of:

A) providing an electrical source of D.C. voltage;

B) providing a periodic connection of said source of D.C. voltage with at least one load of a lower rated D.C. voltage for a predetermined amount of time sufficiently long for said load to operate; and C) selectively interrupting said periodic connection so that only when not interrupted said load is allowed to operate.

7. The method set forth in claim 6, further including the step of:

F) allocating separate time slots for said time periods for each load.

8. The method set forth in claim 7 wherein said separate time slots are contiguous.

9. The method set forth in claim 8 wherein the rate of repetition of said repetitive connection varies from 60 Hertz to 200 Hertz.

* * * * *